United States Patent
Gao et al.

(10) Patent No.: US 11,778,714 B2
(45) Date of Patent: Oct. 3, 2023

(54) CONTROL METHOD AND ELECTRONIC DEVICE

(71) Applicant: LENOVO (BEIJING) LIMITED, Beijing (CN)

(72) Inventors: Ying Gao, Beijing (CN); Zhihu Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 264 days.

(21) Appl. No.: 17/280,200

(22) PCT Filed: Sep. 26, 2019

(86) PCT No.: PCT/CN2019/108159
§ 371 (c)(1),
(2) Date: Mar. 26, 2021

(87) PCT Pub. No.: WO2020/063748
PCT Pub. Date: Apr. 2, 2020

(65) Prior Publication Data
US 2022/0039242 A1    Feb. 3, 2022

(30) Foreign Application Priority Data
Sep. 30, 2018   (CN) .......................... 201811162742.9

(51) Int. Cl.
*H05B 47/155*   (2020.01)
*H05B 47/105*   (2020.01)
(Continued)

(52) U.S. Cl.
CPC ....... *H05B 47/155* (2020.01); *G06V 40/1318* (2022.01); *H05B 47/29* (2020.01)

(58) Field of Classification Search
CPC ........... G06V 40/1365; G06V 40/1318; H05B 47/155; H05B 47/165; H05B 47/29
See application file for complete search history.

(56) References Cited

U.S. PATENT DOCUMENTS

2015/0331508 A1* 11/2015 Nho ........................ G06F 3/042
                                                              345/173
2016/0255698 A1   9/2016 Harbers et al.
2018/0220507 A1   8/2018 Harbers et al.

FOREIGN PATENT DOCUMENTS

| CN | 101960915 A | 1/2011 |
| CN | 101960915 B | 7/2012 |

(Continued)

OTHER PUBLICATIONS

The World Intellectual Property Organization (WIPO) International Search Report for PCT/CN2019/108159 dated Dec. 30, 2019 7 pages (including translation).

*Primary Examiner* — Henry Luong
(74) *Attorney, Agent, or Firm* — ANOVA LAW GROUP, PLLC

(57) ABSTRACT

A control method includes determining a first control signal of a first control unit, determining a second control signal of a second control unit, and controlling a light effect of the illumination device according to a control rule, the first control signal, and the second control signal. The first control signal is used to control an illumination device to generate a first light effect. The second control signal is used to control the illumination device to generate a second light effect.

13 Claims, 4 Drawing Sheets

(51) Int. Cl.
*G06V 40/12* (2022.01)
*H05B 47/29* (2020.01)
*G06V 40/13* (2022.01)

(56) References Cited

FOREIGN PATENT DOCUMENTS

| | | | |
|---|---|---|---|
| CN | 104410803 | A | 3/2015 |
| CN | 104519283 | A | 4/2015 |
| CN | 104866406 | A | 8/2015 |
| CN | 105100457 | A | 11/2015 |
| CN | 105321466 | A | 2/2016 |
| CN | 205644579 | U | 10/2016 |
| CN | 106339697 | A | 1/2017 |
| CN | 106548055 | A | 3/2017 |
| CN | 106991394 | A | 7/2017 |
| CN | 206353269 | U | 7/2017 |
| CN | 107885116 | A | 4/2018 |
| CN | 109362145 | A | 2/2019 |

* cited by examiner

CONTROL METHOD AND ELECTRONIC DEVICE

CROSS-REFERENCE TO RELATED APPLICATIONS

This application is a national phase entry under 35 U.S.C. § 371 of International Application No. PCT/CN2019/108159, filed on Sep. 26, 2019, which claims priority to Chinese Application No. 201811162742.9, filed on Sep. 30, 2018, the entire contents of both of which are incorporated herein by reference.

TECHNICAL FIELD

The present disclosure generally relates to a control method and an electronic device.

BACKGROUND

With the development of electronic technology, an electronic device has become well integrated. Different functional modules can be integrated into the electronic device. For example, a fingerprint module having a fingerprint collection function and a switch module having a function of turning on and off the electronic device may be integrated together to collect the fingerprint and turn on and off the electronic device based on an integration structure, respectively.

Currently, indicators corresponding to the different functional modules that are integrated together are arranged in a same area. However, the indicators of the different functional modules are controlled by different controllers, which causes a conflict in the behaviors of the indicators.

SUMMARY

Based on this, the present disclosure provides a control method. The present disclosure provides the following technical solutions.

The control method includes:
determining a first control signal of a first control unit, the first control signal being used to control an illumination device to generate a first light effect;
determining a second control signal of a second control unit, the second control signal being used to control the illumination device to generate a second light effect; and
controlling a light effect of the illumination device according to a control rule, the first control signal, and the second control signal.

In an embodiment, the first control signal is generated in response to the first control unit satisfying a first condition. The first light effect is used to indicate that the first condition is satisfied. The second control signal is generated in response to the second control unit satisfying a second condition. The second light effect is used to indicate that the second condition is satisfied.

In an embodiment, the first light effect and the second light effect are generated by the same illumination device. Controlling the light effect of the illumination device according to the control rule, the first control signal, and the second control signal includes:
selecting the first control signal with a high priority to control the illumination device to generate the first effect according to predetermined priorities and ignoring the second control signal; or controlling the illumination device to generate a third light effect according to a predetermined processing rule, the first control signal, and the second control signal, a light effect obtained by superposing the first light effect and the second light effect being different from the third light effect.

In an embodiment, the first light effect and the second light effect are generated by different illumination devices. Light of the different illumination devices is emitted through a preset optical assembly. Light effects of the different illumination devices sensed by a user are in a same area. Controlling the light effect of the illumination device according to the predetermined control rule, the first control signal, and the second control signal includes:
selecting the first control signal with a high priority to control a corresponding illumination device to generate the first light effect according to predetermined priorities; and
ignoring the second control signal.

In an embodiment, determining the first control signal of the first control unit includes at least one of:
determining first information of the first control unit, the first information being control information received by the first control unit, the control information being used to control an operating status of the first control unit, and the first information being used to control the illumination device to generate a first sub-light effect;
determining second information of the first control unit, the second information indicating an information processing result status of the first control unit, and the second information being used to control the illumination device to generate a second sub-light effect; or
determining third information of the first control unit, the third information being first type information obtained by the first control unit classifying the first information and the second information, and the third information being used to control the illumination device to generate a third sub-light effect.

In an embodiment, the first control unit includes a control unit corresponding to a switch module. The first information includes information indicating that an electronic device is in an operating state, information indicating that the electronic device enters the operating state from a non-operating state again, information indicating that the electronic device enters the non-operating state from the operating state again, information indicating that the electronic device is in a sleeping state, or information indicating that the electronic device is in the non-operating state.

In an embodiment, the first control unit includes a control unit corresponding to a fingerprint module. The first information includes information indicating that the fingerprint module is in an operating state or information indicating that the fingerprint module is in a non-operating state. The second information includes information indicating that fingerprint recognition obtained by the fingerprint module is successful, information indicating that the fingerprint recognition obtained by the fingerprint module is failed, indication information indicating of fingerprint input obtained by the fingerprint module, information indicating that fingerprint collection obtained by the fingerprint module is failed, or information indicating that the fingerprint collection obtained by the fingerprint module is successful. The third information includes a first type of information, information of a same type being used to control the illumination device to generate a same light effect.

An electronic device includes:
an illumination device; and
a controller, configured to:

determine a first control signal of a first control unit, the first control signal being used to control the illumination device to generate a first light effect;

determine a second control signal of a second control unit, the second control signal being used to control the illumination device to generate a second light effect; and control a light effect of the illumination device according to a control rule, the first control signal, and the second control signal.

In an embodiment, the first light effect is generated by a first illumination device, and the second light effect is generated by a second illumination device. The apparatus further includes an optical assembly. Light of different illumination devices is emitted through the optical assembly. Light effects of the different illumination devices sensed by a user are in a same area.

In an embodiment, the electronic device further includes a power source, configured to provide electricity to the electronic device. The first control unit includes a control unit corresponding to a switch module, which is configured to control the illumination device based on an operating status of the electronic device; or the first control unit includes a control unit corresponding to a fingerprint module, which is configured to recognize the fingerprint and obtain first classification information according to an operating status of the first control unit and an information processing result status of the first control unit to control the illumination device; or the first control unit includes the control unit corresponding to the fingerprint module, which is configured to recognize the fingerprint and control the illumination device according to the first classification information obtained by classifying the operating status of the first control unit and the information processing result of the first control unit.

According to the technical solutions above, compared to the existing technology, the present disclosure provides the control method and the electronic device. The method includes determining the first control signal of the first control unit, the first control signal being used to control the illumination device to generate the first light effect; determining the second control signal of the second control unit, the second control signal being used to control the illumination device to generate the second light effect; and controlling the light effect of the illumination device according to the control rule, the first control signal, and the second control signal. By using the method, when a plurality of control units are configured to control and generate different light effects, the light effects of the indicator may be controlled in connection with control signals of the plurality of control units according to a predetermined control rule. The behaviors of controlling the indicator may be coordinated for the plurality of the control units. A conflict in the behaviors of the indicator may be avoided, which ensures that the user can know a status corresponding to the control units in the current apparatus directly according to the light effect of the illumination device.

BRIEF DESCRIPTION OF THE DRAWINGS

In order to more clearly describe the technical solutions in embodiments of the present disclosure or the prior art, the drawings needed in the description of the embodiments or prior art are briefly introduced as follows. Obviously, the drawings in the following description are merely embodiments of the present disclosure. For those of ordinary skill in the art, other drawings may be obtained according to the provided drawings without creative effort.

DETAILED DESCRIPTION OF THE EMBODIMENTS

Embodiments of the present disclosure are described in detail in connection with the accompanying drawings below. Described embodiments are merely some embodiments of the present disclosure but not all embodiments. Based on embodiments of the present disclosure, all other embodiments obtained by those of ordinary skill in the art without creative effort should be within the scope of the present disclosure.

A control method provided by embodiments of the present disclosure may be applied in an electronic device. The electronic device may include at least two functional modules (a control unit described in embodiments of the present disclosure may be integrated into a corresponding functional module, or include the corresponding functional module, or be the corresponding functional module) that are integrated together. Indicators corresponding to at least two functional modules may be arranged in a same area of the electronic device. For example, the electronic device may include a terminal apparatus of a computer, a laptop, a smartphone, or a PAD.

Figure 1:
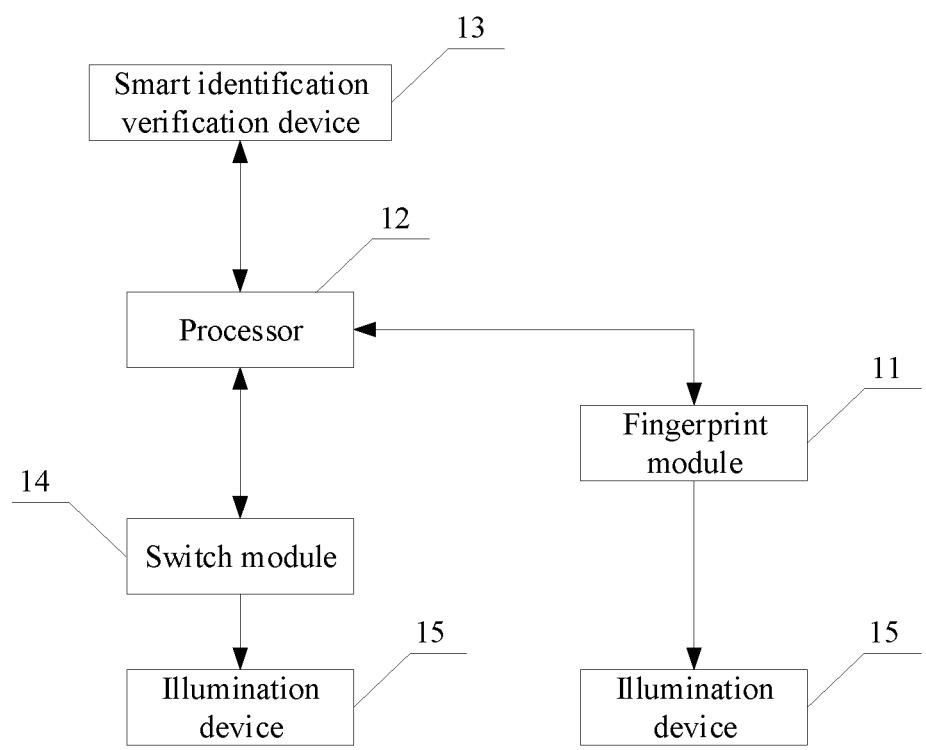
FIG. 1 illustrates a schematic structural diagram of an integrated device in an electronic device according to some embodiments of the present disclosure.

In embodiments of the present disclosure, a device that integrates the at least two functional modules may be referred to as an integrated device. The integrated device that integrates a fingerprint module and a switch module may be taken as an example. A structure of the integrated device is described in connection with FIG. 1 to FIG. 3. FIG. 1 illustrates a schematic structural diagram of the integrated device in the electronic device according to some embodiments of the present disclosure.

The integrated device integrated at least by two functional modules includes a fingerprint module 11, a processor 12, a smart identification verification device 13, a switch module 14, and at least one illumination device 15.

In some embodiments, the smart identification verification device 13 and the fingerprint module 11 may be a same device or devices independent from each other. In some embodiments, the fingerprint module 11, the processor 12, and the smart identification verification device 13 may be a same device or devices independent from each other.

In some embodiments, the processor 12 may include a central processing unit (CPU), and/or the switch module 14 may be included in an embed controller (EC) or be a processor independent of the EC, and/or the smart identification verification device 13 may store a program corresponding to Windows hello, and/or the fingerprint module 11 may include a microcontroller unit (MCU).

In some embodiments, the switch module 14 or the fingerprint module 11 may be connected to the illumination device 15 through a general purpose input output (GPIO). In some embodiments, the processor 12 may be connected to the fingerprint module 11 through a universal serial bus (USB).

The functions between the modules may be as follows.

The fingerprint module 11 may be configured to collect a fingerprint of an operation body 10 that touches the fingerprint module.

Figure 2:
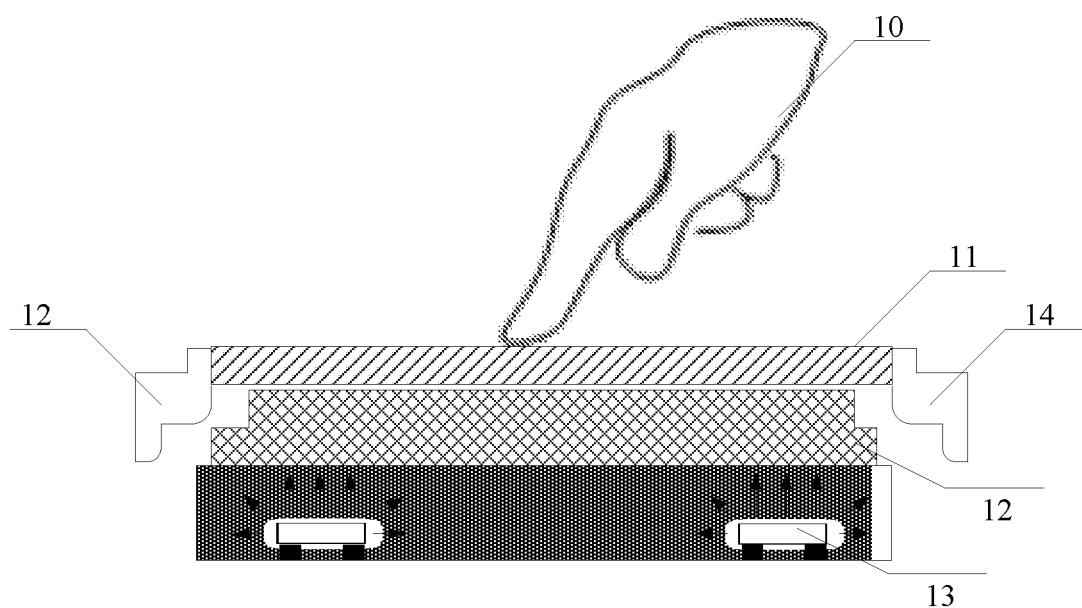
FIG. 2 illustrates a schematic simplified section view showing an integrated device according to some other embodiments of the present disclosure.

FIG. 2 illustrates a schematic simplified section view showing an integrated device according to some other embodiments of the present disclosure. A user may place the operation body 10 on a force bearing surface of the fingerprint module 11.

In some embodiments, when the fingerprint module 11 or a smart identification verification device 13 detects that a touch operation of touching the fingerprint module 11 satisfies a first touch condition, the fingerprint module 11 may be activated to cause the fingerprint module 11 to be in an operating state.

In some embodiments, the touch operation may include a touch time length, and/or a touch strength. The first touch condition may include that the touch time length is longer than or equal to a first predetermined time length, and/or the touch strength is greater than or equal to a first predetermined strength.

In some embodiments, the fingerprint module 11 or the smart identification verification device 13 may be further configured to control the fingerprint module 11 to be turned off to cause the fingerprint module 11 to be in a non-operating state.

In some embodiments, the processor 12 may be configured to transmit the fingerprint collected by the fingerprint module 11 to the smart identification verification device 13.

The smart identification verification device 13 may be configured to compare the fingerprint collected by the fingerprint module 11 to a predetermined fingerprint to obtain a fingerprint recognition result. The fingerprint recognition result may include a successful fingerprint recognition or a failed fingerprint recognition.

If the collected fingerprint matches the predetermined fingerprint, the fingerprint recognition may be successful. If the collected fingerprint does not match the predetermined fingerprint, the fingerprint recognition may be failed.

In some embodiments, the smart identification verification device 13, the fingerprint module 11, or the processor 12 may be further configured to recognize whether the fingerprint collected by the fingerprint module 11 is effective. If the collected fingerprint is not effective, the smart identification verification device 13 or the fingerprint module 11 may generate information of inputting the fingerprint again. If the collected fingerprint is effective, the smart identification verification device 13, the fingerprint module 11, or the processor 12 may generate information of successfully collecting the fingerprint.

In some embodiments, the user may use the electronic device for shopping or logging into an application, which may require inputting the fingerprint. The smart identification verification device 13 or the fingerprint module 11 may be further configured to generate indication information of inputting the fingerprint at a corresponding time based on the application that is running in the electronic device.

In summary, in some embodiments, for the fingerprint module 11, the information corresponding to the fingerprint module 11 may include but not limited to the information indicating that the fingerprint module is in the operating state, the information indicating that the fingerprint module is in the non-operating state, the information indicating that the fingerprint recognition is successful, the information indicating that the fingerprint recognition is failed, the information indicating of inputting the fingerprint again, the information indicating that the fingerprint collection is successful, or the indication information indicating of inputting the fingerprint.

In some embodiments, if all pieces of the above information are obtained by the smart identification verification device 13, the processor 12 may transmit the above information to the fingerprint module 11 or generate a corresponding control signal based on the above information. In some embodiments, different pieces of the information may correspond to different control signals. In some embodiments, the pieces of the information may be classified, different types of information may correspond to different control signals. The information of a same type may correspond to a same control signal. For example, the information indicating inputting the fingerprint again and the indication information indicating inputting the fingerprint may be the same type of information.

The fingerprint module 11 may be further configured to generate different control signals based on different pieces of information and control the illumination device 15 to generate different light effects based on the different control signals, or control the illumination device 15 to generate the different light effects based on the different control signals.

In some embodiments, the light effects may include color, and/or flashing frequency, and/or flashing number, and/or flashing time length.

The switch module 14 may be configured to receive the touch operation of the operation body 10.

In some embodiments, when the processor 12 or the switch module 14 detects that the touch operation of the operation body 10 touching the switch module 14 satisfies a second touch condition, the electronic device may be determined to enter the operating state from the non-operating state again, or enter the non-operating state from the operating state again.

In some embodiments, the touch operation may include the touch time length, and/or the touch strength. The second touch condition may include that the touch time length is longer than or equal to a second predetermined time length, and/or the touch strength is greater than or equal to a second predetermined strength.

In some embodiments, when the electronic device is in the operating state, the processor 12 may detect whether the electronic device is in a sleeping state.

In some embodiments, the processor 12 and the switch module 14 may be a same device or devices independent of each other.

In summary, in some embodiments, for the switch module 14, the information corresponding to the switch module 14 may include but not limited to the information indicating that the electronic device enters the operating state from the non-operating state again, the information indicating that the electronic device enters the non-operating state from the operating state again, the information indicating that the electronic device is in the operating state, the information indicating that the electronic device is in the sleeping state, or the information indicating that the electronic device is in the non-operating state.

In some embodiments, the processor 12 may be configured to transmit the above information to the switch module 14 or generate a control signal based on the above information and transmit the control signal to the switch module 14.

In some embodiments, different pieces of information may correspond to different control signals. In some embodiments, the different pieces of information may be classified. Different types of information may correspond to different control signals. The same type of information may correspond to a same control signal. For example, the information indicating that the electronic device enters the operating state from the non-operating state again and the information indicating that the electronic device enters the non-operating state from the operating state again may be a same type of information.

The switch module 14 may be configured to generate different control signals based on different pieces of information and control the illumination device 15 to generate different light effects based on the different control signals, or control the illumination device 15 to generate the different light effects based on the different control signals.

In some embodiments, the switch module 14 may use the MCU included in the switch module 14 to generate the different control signals based on the different pieces of information and control the illumination device 15 to generate the different light effects based on the different control signals, or control the illumination device 15 to generate the different light effects based on the different control signals.

In some embodiments, the switch module 14 and the fingerprint module 11 may be configured to control a same illumination device or different illumination devices, respectively.

In some embodiments, the illumination device 15 may include one or more LED lights.

In some embodiments, the illumination device 15 may have a certain illumination angle, for example, 360°. Since the illumination device 15 is arranged at a bracket (e.g., a bracket where the illumination device 15 is arranged shown in FIG. 1), a largest illumination angle of the illumination device 15 may be 180° (a small amount of residual light in an area greater than 180°). In addition, the illumination device may include some stray light. Since the light of the illumination device is relatively scattered, an optical assembly 14 may be configured to converge the light of the illumination device to cause the illumination angle of the illumination device to be different illumination angles of 160°, 140°, 120°, 90°, 60°, 40°, or 20°.

In some embodiments, the integrated device further includes the optical assembly 14 (as shown in FIG. 2). The optical assembly 14 may be configured to converge the light emitted from the illumination device 15 to cause the light of the illumination device 15 to converge between two rings of the fingerprint module 11 and the optical assembly 14 shown in FIG. 3 (FIG. 3 illustrates a schematic top view showing an integrated device in the electronic device according to some other embodiments of the present disclosure.)

In some embodiments, no matter the fingerprint module controls the illumination device to generate a corresponding light effect, or the switch module controls the illuminated device to generate a corresponding light effect, the light is emitted through the optical assembly 14. Thus, the user may sense the light effect of the illumination device in a same area, for example, between the two rings of the fingerprint module 11 and the optical assembly 14.

Figure 3:
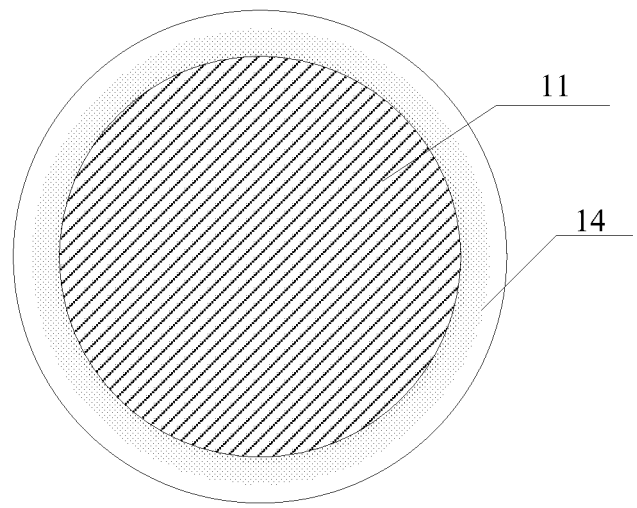
FIG. 3 illustrates a schematic top view showing an integrated device in the electronic device according to some other embodiments of the present disclosure.

In connection with FIG. 1 to FIG. 3, a conflict in behaviors of the indicators caused by using different controllers (e.g., a controller may be included in each of the fingerprint module and the switch module) to control the indicators (the illumination device described in embodiments of the present disclosure is an indicator) corresponding to the different functional modules is described in detail.

The conflict in the behaviors of the indicators is not limited to the following scenarios.

Firstly, if the different functional modules control the same illumination device, the illumination device may receive at least two control signals simultaneously, or the illumination device may receive at least one control signal while generating a light effect. Thus, the illumination device does not know which control signal to respond to.

For example, the fingerprint module and the switch module may control the same illumination device. If the illumination device receives the control signal of the fingerprint module and the control signal of the switch module simultaneously, the illumination device may not respond to both of the control signals. In some embodiments, the fingerprint module controls the illumination device to generate a corresponding light effect based on a control signal, while the switch module needs to control the illumination device based on a control signal. Thus, the illumination device does not know which control signal to respond to.

Secondly, if the different functional modules control different illumination devices, the different illumination devices may receive the corresponding control signals simultaneously and generate corresponding light effects simultaneously. In some embodiments, one of the illumination devices may generate a light effect while another one of the illumination devices may receive a control signal and respond to the control signal to generate a corresponding light effect. Thus, light effects may overlap.

For example, if the fingerprint module and the switch module are configured to control the different illumination devices, respectively, the fingerprint module and the switch module may control the illumination devices to generate different light effects, respectively. The fingerprint module and the switch module may control the corresponding illumination devices to generate the corresponding light effects simultaneously. In some embodiments, the fingerprint module and the switch module may have a time overlap in controlling the corresponding illumination devices to generate the light effects. Since the light of illumination devices corresponding to different functional modules is emitted through the optical assembly 14, a light effect sensed by the user may be a superposition of the corresponding light effects generated by the two illumination devices. For example, the fingerprint module may control the illumination device to generate a light effect of red light, and the switch module may control the illumination device to generate a light effect of green light. Thus, the light effect sensed by the user is yellow light obtained by mixing the red light and the green light.

Thirdly, if the illumination devices controlled by the different functional modules are different illumination devices, to avoid overlapping the light effects, a light effect of an illumination device may be turned off, then another illumination device may be turned on to generate a corresponding light effect. Thus, after a time period (e.g., 1 second), the light effect generated by the illumination device that has been turned off, the another illumination device may be controlled to generate the corresponding light effect, which causes a light effect delay.

For example, the switch module may control an illumination device to generate a corresponding light effect based on a control signal. The fingerprint module may need to control another illumination device to generate a corresponding light effect. Thus, the light effect generated by the illumination device when responding to the control signal of the switch module may need to be turned off first. Then, the fingerprint module may control the corresponding illumination device to generate the corresponding light effect. However, since the different functional modules independently control the corresponding illumination devices, and the different functional modules cannot coordinate their individual behaviors of controlling the illumination devices, the illumination device that has been turned off may generate a light effect by responding to the control signal of the switch module. After a time period, the another functional module may control the corresponding illumination device to generate the corresponding light effect, which causes the delay.

To solve the conflict in the behaviors of controlling the illumination devices, embodiments of the present disclosure provide an electronic device. The electronic device may coordinate the behaviors of controlling the illumination devices for the plurality of functional modules to avoid the above situation.

Figure 4:
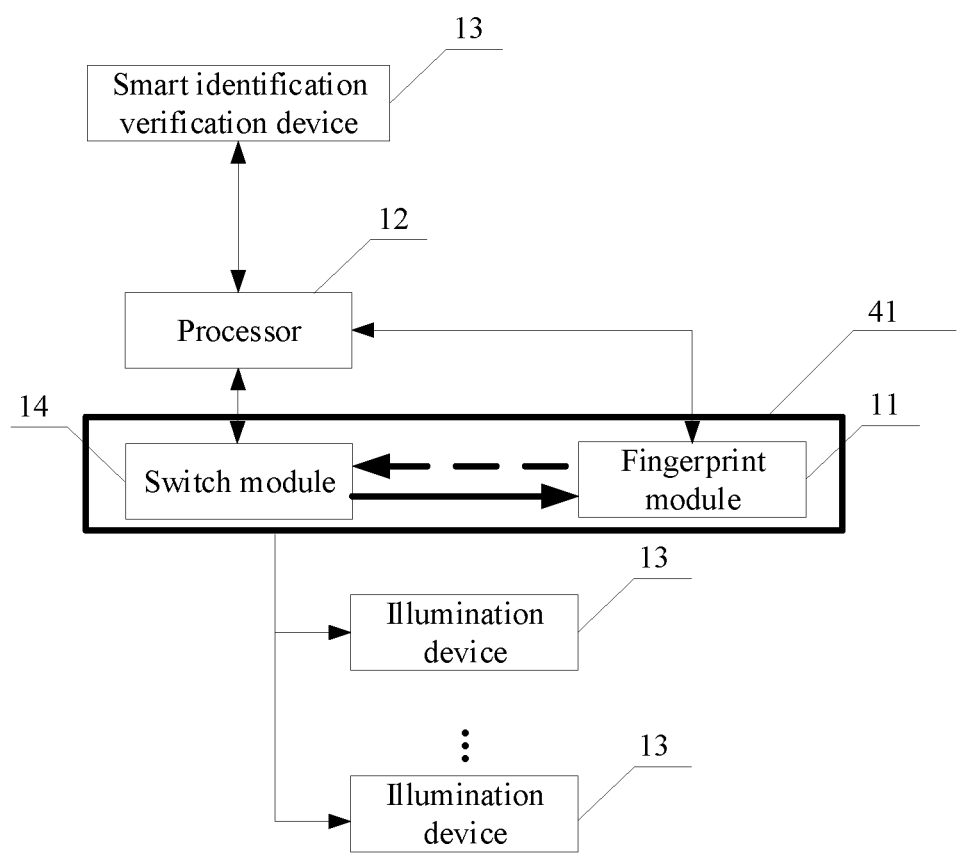
FIG. 4 illustrates a schematic structural diagram of an electronic device according to some embodiments of the present disclosure.

FIG. 4 illustrates a schematic structural diagram of the electronic device according to some embodiments of the present disclosure. The electronic device includes an illumination device 13 and a controller 41.

In some embodiments, the controller 41 may include a control unit corresponding to any one of the functional modules, such as a microcontroller unit (MCU) included in the fingerprint module 11, an embed controller (EC) of the integrated switch module 14, or a controller independent of the control unit corresponding to the any one of the functional modules.

If the controller 41 includes a first control unit corresponding to any one of the functional modules. For example, the first control unit may be a control unit corresponding to the fingerprint module 11. The first control unit may need to be connected to control units corresponding to other functional modules. For example, the first control unit may need to be connected to a control unit corresponding to the fingerprint module 11 and a control unit corresponding to the switch module 14, such that the control unit corresponding to the switch module 14 may transmit its control signal to the control unit corresponding to the fingerprint module 11 (solid arrow shown in FIG. 4). Thus, the first control unit may obtain the control signals of the plurality of control units to coordinate the behaviors of controlling the illumination device.

If the controller 41 includes a second control unit corresponding to any one of the functional modules, such as an EC of the switch module 14. Thus, the second control unit may need to be connected to the control units corresponding to other functional modules. For example, the second control unit may be connected to the control unit corresponding to the fingerprint module 11 and the control unit corresponding to the switch module 14, such that the control unit corresponding to the fingerprint module 11 may transmit its control signal to the control unit corresponding to the switch module 14 (dotted arrow shown in FIG. 4). Thus, the second control unit may obtain the control signals of the plurality of control units to coordinate the behaviors of controlling the illumination device.

If the controller 41 is a controller independent of the control unit of any one of the functional modules, such as a controller independent of the control units corresponding to the fingerprint module 11 and the switch module 14. Thus, the controller 41 may need to be connected to the control units corresponding to the functional modules and the illumination device 13. For example, the controller 41 may need to be connected to the fingerprint module 11, the switch module 14, and the illumination device 13. The control unit corresponding to the fingerprint module 11 may transmit its control signal to the controller 41. The control unit corresponding to the switch module 14 may transmit its control signal to the controller 41. The controller 41 may coordinate the control signals, that is, coordinate the behaviors of controlling the illumination device.

In some embodiments, the controller 41 may be configured to determine the first control signal of the first control unit. The first control signal may be used to control the illumination device to generate a first light effect. The controller 41 may be configured to determine a second control signal of the second control unit. The second control signal may be used to control the illumination device to generate a second light effect. the controller 41 may be configured to control the light effect of the illumination device according to a control rule, the first control signal, and the second control signal.

A control method provided by embodiments of the present disclosure is described in connection with FIG. 4.

Figure 5:
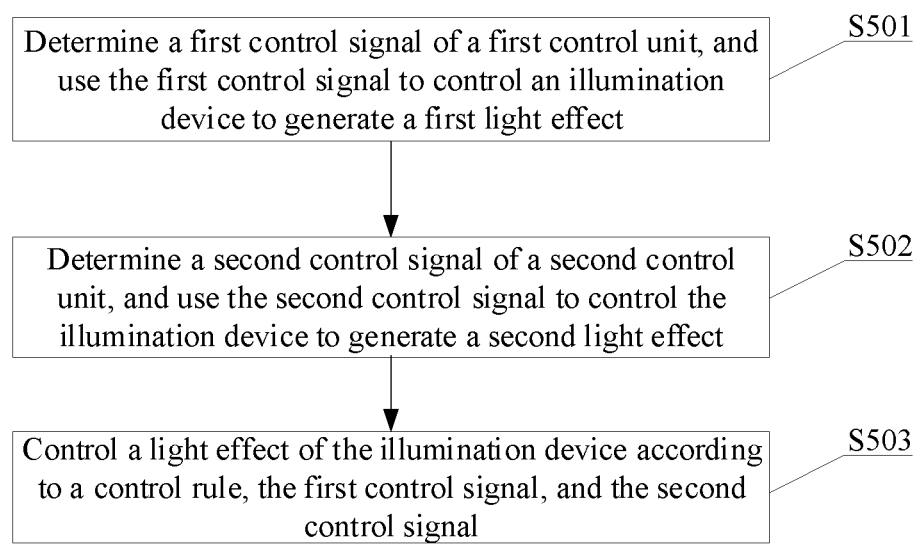
FIG. 5 illustrates a schematic flowchart of a control method according to some other embodiments of the present disclosure.

FIG. 5 illustrates a schematic flowchart of a control method according to some other embodiments of the present disclosure.

The method includes the following processes.

At S501, the first control signal of the first control unit is determined, and the first control signal is used to control the illumination device to generate the first light effect.

In some embodiments, the first control unit may include a control unit corresponding to any one of the functional modules, such as the control unit corresponding to the fingerprint module or the control unit corresponding to the switch module.

In some embodiments, the first control signal may be generated when the first control unit satisfies a first condition. The first light effect may be used to indicate that the first condition is satisfied.

In some embodiments, the first condition may include but not limited to that the first control unit may obtain one or more pieces of the following information: the information indicating that the fingerprint module is in the operating state or in the non-operating state, the information indicating that the fingerprint recognition is successful, the information indicating that the fingerprint recognition is failed, the information indicating of inputting the fingerprint again, the information indicating that the fingerprint collection is successful, the indication information indicating of inputting the fingerprint, the information indicating that the electronic device enters the operating state from the non-operating state again, the information indicating that the electronic device enters the non-operating state from the operating state again, the information indicating that the electronic device is in the operating state, the information indicating that the electronic device is in the sleeping state, or the information indicating that the electronic device is in the non-operating state.

In some embodiments, the first control signal may be generated by the first control unit, the controller 41, or the processor 16.

In some embodiments, the first condition may be different, and the corresponding first light effect may be different. The first light effect is used to indicate to the user that the first condition is currently satisfied. For example, the illumination device may generate a light effect of lighting up continuously for 5 seconds to indicate to the user that the electronic device enters operating state from the non-operating state again.

In some embodiments, to reduce a number of illumination devices or to reduce a number of LED lights included in an illumination device, different signals may be classified. Signals of the same type may correspond to the same first condition. Signals of different types may correspond to different first conditions. First light effects corresponding to the first conditions of the different types may be different. The first light effect corresponding to the first condition of the same type may be the same.

At S502, the second control signal of the second control unit may be determined, and the second control signal is used to control the illumination device to generate the second light effect.

In some embodiments, the second control unit may include a control unit corresponding to any one of the functional modules, such as the control unit corresponding to the fingerprint module or the control unit corresponding to the switch module.

In some embodiments, the second control signal may be generated when the second control unit satisfies the second condition. The second light effect may be used to indicate that the second condition is satisfied.

In some embodiments, the second condition may include but not limited to that the second controller obtains one or more pieces of the following information: the information indicating that the fingerprint module is in the operating state or in the non-operating state, the information indicating that the fingerprint recognition is successful, the information indicating that the fingerprint recognition is failed, the information indicating of inputting the fingerprint again, the information indicating that the fingerprint collection is successful, the indication information indicating of inputting the fingerprint, the information indicating that the electronic device enters the operating state from the non-operating state again, the information indicating that the electronic device enters the non-operating state from the operating state again, the information indicating that the electronic device is in the operating state, the information indicating that the electronic device is in the sleeping state, or the information indicating that the electronic device is in the non-operating state.

In some embodiments, the second control signal may be generated by the second control unit, the controller 41, or the processor 16.

In some embodiments, the second conditions may be different, and corresponding second light effects may be different. A second light effect may be used to indicate to the user that the second condition is currently satisfied. For example, the illumination device may generate a light effect of flashing to indicate to the user that the electronic device is in the sleeping state.

In some embodiments, to reduce the number of the illumination devices or the number of the LED lights included in the illumination device, the different signals may be classified. Signals of a same type may correspond to a same second condition. Signals of different types may correspond to different second conditions. The second light effects corresponding to the second conditions of different types may be different. The second light effect corresponding to the second condition of the same type may be the same.

At S503, the light effect of the illumination device may be controlled according to the control rule, the first control signal, and the second control signal.

In some embodiments, the different control units may control different illumination devices, respectively, or the different control units may control the same illumination device.

In some embodiments, the control method provided by embodiments of the present disclosure may be applied to the first control unit, the second control unit, or a processor independent of the first control unit and the second control unit.

In some embodiments, the control rule may include predetermined priorities or predetermined processing rules.

Firstly, the control rule may include the predetermined priorities. In some embodiments, if the first light effect and the second light effect are generated by the same illumination device, controlling the light effect of the illumination device according to the control rule, the first control signal, and the second control signal may include selecting the first control signal with a high priority to control the illumination device to generate the first light effect and ignoring the second control signal according to the predetermined priorities, or controlling the illumination device to generate the corresponding light effects in order based on the control signals corresponding to the priorities from high to low according to the predetermined priorities.

In some embodiments, the priorities may be set for different control signals. For example, the priority of the control signal corresponding to the fingerprint module may higher than the priority of the control signal corresponding to the switch module.

If the first control signal of the first control unit and the second control signal of the second control unit are obtained at the same moment, based on the predetermined priorities, the first control signal with the higher priority may be selected to control the illumination device to generate the first light effect, and the second control signal may be ignored.

If the second control signal of the second control unit is obtained while the corresponding illumination device is controlled to generate the first light effect based on the first control signal of the first control unit, in some embodiments, the priority of the first control signal which is currently used to control the illumination device to generate the first light effect may be determined to have a highest priority, and the second control signal may be ignored. In some embodiments, if the second control signal is higher in priority than the first control signal, controlling the illumination device to generate the first light effect based on the first control signal may be stopped. The illumination device may be controlled based on the second control signal with the highest priority to cause the illumination device to generate the second light effect.

In summary, even the control signals corresponding to the different control units are obtained at the same moment, respectively, the illumination device may only be controlled based on the control signal with the highest priority to generate the light effect. Thus, the situation of not knowing which control signal to respond to may not occur.

If the first control signal of the first control unit and the second control signal of the second control unit are obtained at the same moment, based on the predetermined priorities, the first control signal with a higher priority may be selected to control the illumination device to generate the first light effect. After the first light effect is completed, the illumination device may be controlled based on the second control signal lower in priority than the first control signal to generate the second light effect.

If the second control signal of the second control unit is obtained while the corresponding illumination device is controlled to generate the first light effect based on the first control signal of the first control unit, in some embodiments, the priority of the first control signal that is currently used to control the illumination device to generate the first light effect may be determined to have the highest priority. After the first light effect is completed, the illumination device may be controlled to generate the second light effect based on the second control signal that is lower in priority than the first control signal.

In summary, since the control signals are executed in order based on the priorities, the light effect delay may not occur.

Secondly, the control rule may include the predetermined priorities. In some embodiments, if the first light effect and the second light effect are generated by the different illumination devices, the different illumination devices may emit light through the preset optical assembly. Thus, the light effects of the different illumination devices sensed by the user may be in the same area. Controlling the light effect of the illumination device according to the control rule, the first control signal, and the second control signal may include selecting the first control signal with a high priority to control the illumination device to generate the first light effect and ignoring the second control signal according to the predetermined priorities, or controlling the corresponding illumination device to generate corresponding light effects in order based on the control signals corresponding to the priorities from high to low according to the predetermined priorities.

If the second control signal of the second control unit is obtained while the illumination device is controlled to generate the first light effect based on the first control signal of the first control unit, in some embodiments, the priority of the first control signal that is currently used to control the illumination device to generate the first light effect may be determined to have the highest priority, and the second control signal may be ignored. In some embodiments, if the second control signal is higher in priority than the first control signal, controlling the illumination device to generate the first light effect based on the first control signal may be stopped. The illumination device may be controlled based on the second control signal with the highest priority to cause the illumination device to generate the second light effect.

In summary, the different control units may control the different illumination devices, respectively. Even if a plurality of control signals are included at the same moment, the corresponding illumination device may be controlled to generate the light effect only based on the control signal with the highest priority. Therefore, a situation of overlapping the light effects may not occur.

If the first control signal of the first control unit and the second control signal of the second control unit are obtained at the same moment, based on the predetermined priorities, the first control signal with the higher priority may be selected to control the illumination device to generate the first light effect. After the first light effect is completed, the illumination device may be controlled based on the second control signal lower in priority than the first control signal to generate the second light effect.

If the second control signal of the second control unit is obtained while the corresponding illumination device is controlled to generate the first light effect based on the first control signal of the first control unit, in some embodiments, the priority of the first control signal that is currently used to control the illumination device to generate the first light effect may be determined to have the highest priority. After the first light effect is completed, the illumination device may be controlled to generate the second light effect based on the second control signal that is lower in priority than the first control signal.

In summary, since the control signals are executed in order based on the priorities, the light effect delay may not occur.

Thirdly, the control rule may include the predetermined processing rule. In some embodiments, if the first light effect and the second light effect are generated by the same illumination device, controlling the light effect of the illumination device according to the control rule, the first control signal, and the second control signal may include controlling the illumination device to generate a third light effect according to the predetermined processing rule, the first control signal, and the second control signal. The light effect obtained by superposing the first light effect and the second light effect may be different from the third light effect.

In some embodiments, a third control signal may be obtained based on the first control signal and the second control signal. The illumination device may be controlled to generate the third light effect based on the third control signal.

In some embodiments, the illumination device may at least include a first pin and a second pin. The first pin may be connected to the first control unit. The second pin may be connected to the second control unit. Assume that only the first control unit inputs the first control signal to the illumination device via the first pin, the illumination device may generate the first light effect. If only the second control unit inputs the second control signal to the illumination device via the second pin, the illumination device may generate the second light effect. If the first control unit and the second control unit input the corresponding control signals to the illumination device simultaneously, the illumination device may generate the third light effect.

In summary, in embodiments of the present disclosure, the plurality of control signals may be converted into one control signal. Therefore, the conflict in behaviors may not occur.

In another embodiment, determining the first control signal of the first control unit may include at least one of:

determining first information of the first control unit, the first information being control information received by the first control unit, the control information being used to control an operating status of the first control unit, the first information being used to control the illumination device to generate a first sub-light effect;

determining second information of the first control unit, the second information indicating an information processing result status of the first control unit, the second information being used to control the illumination device to generate a second sub-light effect; or determining third information of the first control unit, the third information being first type information obtained by the first control unit classifying the first information and the second information, the third information being used to control the illumination device to generate a third sub-light effect.

In some embodiments, the first control unit may include the control unit corresponding to the switch module. The first information may include the information indicating that the electronic device is in the operating state, the information indicating that the electronic device enters the non-operating state from the operating state again, the information indicating that the electronic device is in the sleeping state, or the information indicating that the electronic device is in the non-operating state.

In some embodiments, the first control unit may include the control unit corresponding to the fingerprint module. The first information may include the information indicating that the fingerprint module is in the operating state, or the information indicating that the fingerprint module is in the non-operating state.

The second information may include the information indicating that the fingerprint recognition result obtained by the fingerprint module is successful or failed, the information indicating that the fingerprint recognition obtained by the fingerprint module is failed, the information indicating that the fingerprint recognition obtained by the fingerprint module is successful, or the indication information indicating of inputting the fingerprint obtained by the fingerprint module.

The third information may include the first type of information. Information of the same type may be used to control the illumination device to generate the same light effect.

For example, the information indicating that the fingerprint recognition obtained by the fingerprint module is successful, the information indicating that the fingerprint recognition obtained by the fingerprint module is failed, the indication information indicating of the fingerprint input obtained by the fingerprint module, the information indicating that the fingerprint collection obtained by the fingerprint module is failed, and the information indicating that the fingerprint collection obtained by the fingerprint module is successful may be classified into three types.

For example, the information indicating that the fingerprint recognition result obtained by the fingerprint module is successful and the information indicating that the fingerprint collection obtained by the fingerprint module is successful may belong to a type. The information indicating that the fingerprint recognition result obtained by the fingerprint module is failed and the information indicating that the fingerprint collection obtained by the fingerprint module is failed may belong to another type. The indication information indicating inputting the fingerprint obtained by the fingerprint module may belong to another type. The first type of information may be any type of information.

The classification may be determined based on the actual situation. Embodiments of the present disclosure provide but is not limited to the above classification.

Corresponding to the control method provided by embodiments of the present disclosure, embodiments of the present disclosure further provide the electronic device as shown in FIG. 4.

In the electronic device shown in FIG. 4, in some embodiments, the first light effect may be generated by a first illumination device, and the second light effect may be generated by a second illumination device.

The electronic device further includes the optical assembly.

The light of the different illumination devices may be emitted through the optical assembly. Thus, the light effects of the different illumination devices sensed by the user may be in the same area.

In some embodiments, the electronic device may include a power source, which may be configured to provide power for the electronic device.

The first control unit may include the control unit corresponding to the switch module, which may be configured to control the illumination device based on the operating status of the electronic device.

In some embodiments, the first control unit may include the control unit corresponding to the fingerprint module, which may be configured to recognize a fingerprint and control the illumination device according to first classification information obtained according to the operating status of the first control unit and the information processing result status of the first control unit.

In some embodiments, the first control unit may include the control unit corresponding to the fingerprint module, which may be configured to recognize the fingerprint and control the illumination device according to first classification information obtained by classifying the operating status of the first control unit and the information processing result status of the first control unit.

Embodiments of the present disclosure are described in a progressive manner. Each embodiment focuses on the differences from other embodiments, and the same or similar parts between the embodiments may refer to each other. As for the device provided by embodiments of the present disclosure, since it corresponds to the method provided by embodiments of the present disclosure, the description is relatively simple, and the relevant part may refer to the description of the method part.

The description of embodiments of the present disclosure enables those skilled in the art to implement or apply the present disclosure. Various modifications to these embodiments are obvious to those skilled in the art. The general principles defined herein may be implemented in other embodiments without departing from the spirit or scope of the present disclosure. Therefore, the present disclosure is not limited to the embodiments in the specification, but should conform to the widest scope consistent with the principles and novel features provided in the specification.

What is claimed is:

1. A control method, comprising:
   determining a first control signal of a first control unit, the first control signal being used to control an illumination device to generate a first light effect;
   determining a second control signal of a second control unit, the second control signal being used to control the illumination device to generate a second light effect, the first light effect and the second light effect being generated by the same illumination device; and
   controlling a light effect of the illumination device according to a control rule, the first control signal, and the second control signal, including:
   selecting the first control signal with a high priority to control the illumination device to generate the first effect according to predetermined priorities and ignoring the second control signal; or
   controlling the illumination device to generate a third light effect according to a predetermined processing rule, the first control signal, and the second control signal, a combined light effect of the first light effect and the second light effect being different from the third light effect.

2. The method of claim 1, wherein:
   the first control signal is generated in response to the first control unit satisfying a first condition, the first light effect being used to indicate that the first condition is satisfied; and
   the second control signal is generated in response to the second control unit satisfying a second condition, the second light effect being used to indicate that the second condition is satisfied.

3. The method of claim 2, wherein determining the first control signal of the first control unit includes at least one of:
   determining first information of the first control unit, the first information being control information received by the first control unit, the control information being used to control an operating status of the first control unit, and the first information being used to control the illumination device to generate a first sub-light effect;

determining second information of the first control unit, the second information indicating an information processing result status of the first control unit, and the second information being used to control the illumination device to generate a second sub-light effect; or determining third information of the first control unit, the third information being first type information obtained by the first control unit classifying the first information and the second information, and the third information being used to control the illumination device to generate a third sub-light effect.

4. The method of claim 3, wherein:
the first control unit includes a control unit corresponding to a switch module;
the first information includes:
information indicating that an electronic apparatus is in an operating state;
information indicating that the electronic apparatus enters the operating state from a non-operating state again;
information indicating that the electronic apparatus enters the non-operating state from the operating state again;
information indicating that the electronic apparatus is in a sleeping state; or
information indicating that the electronic apparatus is in the non-operating state.

5. The method of claim 3, wherein:
the first control unit includes a control unit corresponding to a fingerprint module;
the first information includes information indicating that the fingerprint module is in an operating state or information indicating that the fingerprint module is in a non-operating state;
the second information includes information indicating that fingerprint recognition obtained by the fingerprint module is successful, information indicating that the fingerprint recognition obtained by the fingerprint module is failed, indication information indicating of fingerprint input obtained by the fingerprint module, information indicating that fingerprint collection obtained by the fingerprint module is failed, or information indicating that the fingerprint collection obtained by the fingerprint module is successful; and
the third information includes a first type of information, information of a same type being used to control the illumination device to generate a same light effect.

6. An electronic apparatus, comprising:
an illumination device; and
a controller, configured to:
determine a first control signal of a first control unit, the first control signal being used to control the illumination device to generate a first light effect;
determine a second control signal of a second control unit, the second control signal being used to control the illumination device to generate a second light effect, the first light effect and the second light effect being generated by the same illumination device; and
control a light effect of the illumination device according to a control rule, the first control signal, and the second control signal, including:
selecting the first control signal with a high priority to control the illumination device to generate the first effect according to predetermined priorities and ignoring the second control signal; or
controlling the illumination device to generate a third light effect according to a predetermined processing rule, the first control signal, and the second control signal, a combined light effect of the first light effect and the second light effect being different from the third light effect.

7. The apparatus of claim 6, wherein:
the first light effect is generated by a first illumination device; and
the second light effect is generated by a second illumination device;
the apparatus further comprising:
an optical assembly, light of different illumination devices being emitted through the optical assembly; and
light effects of the different illumination devices sensed by a user are in a same area.

8. The apparatus of claim 6, further comprising:
a power source, configured to provide power to the electronic apparatus;
wherein:
the first control unit includes a control unit corresponding to a switch module, which is configured to control the illumination device based on an operating status of the electronic apparatus;
the first control unit includes a control unit corresponding to a fingerprint module, which is configured to recognize the fingerprint and obtain a first classification information according to an operating status of the first control unit and an information processing result status of the first control unit to control the illumination device; or
the first control unit includes the control unit corresponding to the fingerprint module, which is configured to recognize the fingerprint and control the illumination device according to the first classification information obtained by classifying the operating status of the first control unit and the information processing result of the first control unit.

9. The apparatus of claim 6, wherein:
the first control unit is configured to generate the first control signal in response to the first control unit satisfying a first condition, the first light effect being used to indicate that the first condition is satisfied; and
the second control unit is configured to generate the second control signal is generated in response to the second control unit satisfying a second condition, the second light effect being used to indicate that the second condition is satisfied.

10. The apparatus of claim 9, wherein the controller is further configured to determine at least one of:
first information of the first control unit, the first information being control information received by the first control unit, the control information being used to control an operating status of the first control unit, and the first information being used to control the illumination device to generate a first sub-light effect;
second information of the first control unit, the second information indicating an information processing result status of the first control unit, and the second information being used to control the illumination device to generate a second sub-light effect; or
third information of the first control unit, the third information being first type information obtained by the first control unit classifying the first information and the second information, and the third information being used to control the illumination device to generate a third sub-light effect.

11. The apparatus of claim 10, wherein:
the first control unit includes a control unit corresponding to a switch module;
the first information includes:
- information indicating that an electronic apparatus is in an operating state;
- information indicating that the electronic apparatus enters the operating state from a non-operating state again;
- information indicating that the electronic apparatus enters the non-operating state from the operating state again;
- information indicating that the electronic apparatus is in a sleeping state; or
- information indicating that the electronic apparatus is in the non-operating state.

12. The apparatus of claim 10, wherein:
the first control unit includes a control unit corresponding to a fingerprint module;
the first information includes information indicating that the fingerprint module is in an operating state or information indicating that the fingerprint module is in a non-operating state;
the second information includes information indicating that fingerprint recognition obtained by the fingerprint module is successful, information indicating that the fingerprint recognition obtained by the fingerprint module is failed, indication information indicating of fingerprint input obtained by the fingerprint module, information indicating that fingerprint collection obtained by the fingerprint module is failed, or information indicating that the fingerprint collection obtained by the fingerprint module is successful; and
the third information includes a first type of information, information of a same type being used to control the illumination device to generate a same light effect.

13. A control method, comprising:
determining a first control signal of a first control unit, the first control signal being used to control an illumination device to generate a first light effect;
determining a second control signal of a second control unit, the second control signal being used to control the illumination device to generate a second light effect, wherein:
- the first light effect and the second light effect are generated by different illumination devices,
- light of the different illumination devices is emitted through a preset optical assembly, and
- light effects of the different illumination devices sensed by a user are in a same area; and controlling a light effect of the illumination device according to a control rule, the first control signal, and the second control signal, including:
- selecting the first control signal with a high priority to control a corresponding illumination device to generate the first light effect according to predetermined priorities; and
- ignoring the second control signal.

* * * * *